April 25, 1961   L. M. LISTER   2,981,565
DETACHABLE WHEEL ASSEMBLY
Filed Jan. 7, 1960
FIG. 1
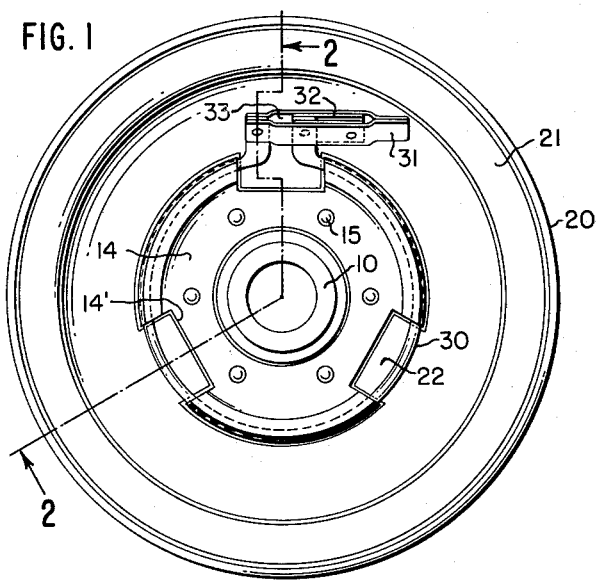
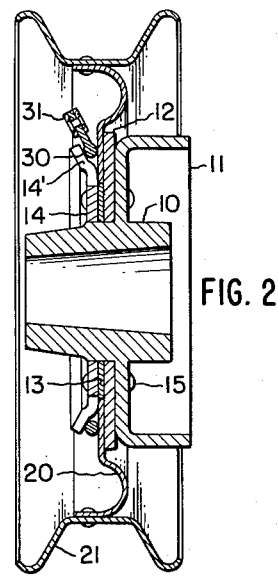
FIG. 2
FIG. 3
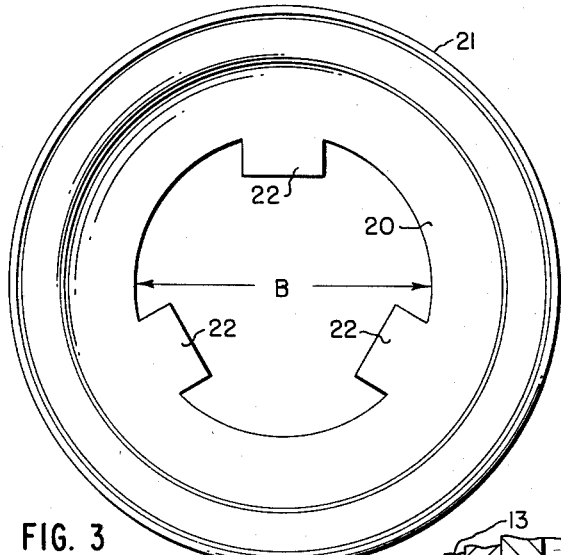
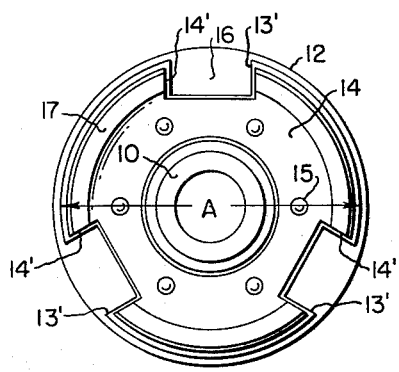
FIG. 4
FIG. 5
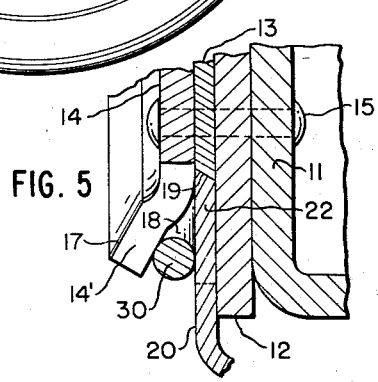
INVENTOR.
LEWARD M. LISTER
BY
KENWAY, JENNEY, WITTER & HILDRETH
ATTORNEYS

United States Patent Office 2,981,565
Patented Apr. 25, 1961

2,981,565
DETACHABLE WHEEL ASSEMBLY
Leward M. Lister, 103 Hart St., Beverly, Mass.
Filed Jan. 7, 1960, Ser. No. 1,018
1 Claim. (Cl. 301—9)

This invention relates to detachable wheel assemblies for vehicles and more particularly comprises a new and improved quick-action connecting arrangement between the detachable tire-carrying rim portion and the drum of a wheel.

In a conventional automobile or truck wheel a tire is inflated over the rim of a wheel which in turn is bolted to the brake drum housing. Since five or more bolts normally hold the wheel to the drum housing, wheel changing is a rather slow and laborious task.

To expedite the wheel changing operation a number of different quick release connecting arrangements have been proposed. One such connecting arrangement features an annular rim having a central opening dimensioned to be slipped axially over a wheel drum. The drum is provided with an annular channel adapted to receive a split ring. This split ring is formed with several flat faces and when locked in position in the channel has one flat face butt against the inner peripheral edge of the rim opening and the inner portion of the channel to hold the wheel rim in place. The free ends of the split ring are brought together and locked by a suitable clamping arrangement.

In practice multi-faced lock rings are relatively expensive to produce since they are drop forged and must be machined, coined or ground to fit the channels and properly engage the rims. Close tolerances must be followed in this type of assembly to insure tight fit. Any looseness between the parts would result in slippage between the rim and the hub as well as producing an undesirable tire wobble.

It is an object of the present invention to provide a quick-demountable wheel in which the rim structure is securely mounted to a wheel drum.

Another object of this invention is to provide an inexpensive yet rugged and dependable split-ring for locking a rim structure to a wheel drum.

Yet another object of this invention is to provide a quick-demountable wheel assembly in which the rim portion interlocks with the drum portion in such manner as positively to prevent slippage or wobble.

More particularly the present invention features a split ring which is formed circular in cross section. A ring of this sort can be fabricated more easily and at much lower cost than a ring having a non-uniform cross section and flat machined face.

As another feature of this invention the rim portion is formed with a plurality of radially spaced lugs adapted to engage with a like number of radially spaced recesses formed on a flat circular flange of the drum portion. A channel is formed about the peripheral portion of the circular flange to receive a toggle operated lock ring which is forced in clamping engagement between the flange and the rim.

These and other novel features of the invention, together with further objects and advantages thereof, will become apparent from the following detailed description of a preferred embodiment of the invention with reference to the accompanying drawings in which:

Fig. 1 is a view in side elevation of a quick-demountable wheel assembly made according to this invention, Fig. 2 is a cross sectional view taken along the line 2—2 of Fig. 1, Fig. 3 is a view in side elevation showing the rim portion of the assembly, Fig. 4 is a view similar to Fig. 3 but showing the drum and hub portion, and Fig. 5 is a detailed view showing the lower portion of Fig. 2 on an enlarged scale.

Referring now to the drawings, reference character 10 indicates a wheel hub of usual construction having a central tapered bore adapted to accommodate axle and wheel bearing assembly (not shown). A conventional brake drum 11 is formed integral with the hub 10 and dimensioned to receive the usual brake shoes and hydraulic apparatus.

Secured to the flat circular face of the drum 11 by bolts or rivets 15 is a flat annular plate 12. Overlaying the plate 12 is an intermediate annular member 13 of slightly smaller outside diameter than the plate 12 and having three radial openings 13' spaced about its outer edge. As seen in Fig. 4 the diameter of the member 13' is indicated by the dimension line marked A. Completing the drum assembly is an outer plate member 14 similar in outline to the member 13 but of slightly smaller diameter. This plate member 14 is formed with three evenly spaced radial openings about its outer edge aligned with the three radial openings 13' of the member 13. These openings define spaced recesses 16 on the face of the drum assembly. As is evident from Figs. 2 and 5 the bolts 15 hold members 13, 14 and 12 rigidly together against the brake drum housing.

As best seen in Figs. 2 and 5 the marginal edges of the arcuate segments 17 of the flat member 14 are flared outwardly and form with the member 13 a channel 18 generally V-shaped in cross section.

Referring now to Figs. 2 and 3 there is shown a demountable wheel rim 20 having a conventional tire seating surface 21. The rim has a central opening with three lugs 22 projecting radially inward. The inside diameter of the rim opening is indicated by the dimension line marked B and approximately equals the diameter A of member 13. The lugs 22 follow the dimensions and contours of the opening 13' so that when the rim 20 is slipped over the hub and up against the circular plate 12 the inner edges of the rim will engage snugly with the outer peripheral edges of the member 13, and the lugs 22 will mate properly with the radial recesses 16. The engaging edges of the lugs 22 and the member 13 may be beveled as indicated at 19 in Fig. 5. Not only will this facilitate seating of the rim but also will provide a wedging fit between the parts.

With the rim located in its proper position on the drum a split ring 30 is seated in the channel 18. Once seated the ring is constricted and locked by a toggle 31. The toggle is provided with an elongated slot 33 to accommodate the pivot arm 32 when the toggle is in its closed position. The ring 30 engages the channel 18 and spans the outer surface of the lugs 22 thereby holding the rim 20 against the drum assembly.

As best seen in Fig. 5 the ring 30 is circular in cross section. When the toggle 31 is closed the resulting constricting pressure will force the ring 30 down into the V-shaped channel 18 for a binding fit. It will be noted that the member 13 is of substantially the same thickness as the rim 20 so that, when assembled, the two parts will be co-planar. This will result in a flat smooth seating surface for the ring 30 across the lugs 22 with no abrupt edges that might tend to shear the ring.

The ring 30 being circular in cross section may be fabricated at a very low cost. For instance a length of standard 5/16 round metal stock of high tensile strength may be cut to the proper length and the ends thereof upset. The toggle may then be attached by rivets in the manner shown.

In the wheel assembly described herein it will be obvious that the rim may be quickly and easily demounted since it is necessary only to open the toggle and remove the split ring 30. The rim may then be withdrawn from the drum.

Although the toggle 31 is shown in Fig. 1 in a position aligned with an opening 14' this is only for purposes of illustration since the toggle may be oriented to any position of the wheel. Thus, when the rim is being assembled, the operator may select the position which will offer the most favorable leverage for closing the toggle.

Having thus described my invention what I claim and desire to secure by Letters Patent is:

A quick-demountable wheel assembly, comprising a hub having a radial flange integrally formed thereon, an annular backing plate mounted on said flange, a flat annular member mounted concentrically on said plate, said member being of slightly smaller diameter than said plate and provided with a plurality of radial openings spaced about its periphery, an annular flared plate mounted concentrically on said annular member, said flared plate being of slightly smaller diameter than said member and provided with radial openings about its periphery, said openings being slightly larger than and in alignment with the openings in said annular member, the arcuate marginal edges of said flared plate defining a channel with said annular member, a rim structure having a flat circular flange presenting spaced radial projections adapted to mate with the recesses of said member, and a toggle-operated ring of round stock adapted to be seated in said channel and forced in clamping engagement between the said marginal edge of said flared plate and the radial projections of said rim.

References Cited in the file of this patent

UNITED STATES PATENTS

| | | |
|---|---|---|
| 1,603,815 | Stratford | Oct. 19, 1926 |
| 2,416,605 | Youngworth | Feb. 25, 1947 |
| 2,442,197 | Craft | May 25, 1948 |